(12) United States Patent
Grawrock

(10) Patent No.: US 6,948,065 B2
(45) Date of Patent: Sep. 20, 2005

(54) PLATFORM AND METHOD FOR SECURELY TRANSMITTING AN AUTHORIZATION SECRET

(75) Inventor: David W. Grawrock, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 837 days.

(21) Appl. No.: 09/752,974

(22) Filed: Dec. 27, 2000

(65) Prior Publication Data

US 2002/0080974 A1 Jun. 27, 2002

(51) Int. Cl.⁷ .............................. H04L 9/16; H04L 9/32
(52) U.S. Cl. ..................... 713/168; 713/156; 713/170; 713/175; 713/185; 705/76
(58) Field of Search ................................ 713/155–158, 713/164, 168, 170, 175, 176, 185; 705/76

(56) References Cited

U.S. PATENT DOCUMENTS

| | | | |
|---|---|---|---|
| 5,001,752 A | 3/1991 | Fischer | 380/23 |
| 5,235,642 A | 8/1993 | Wobber et al. | 380/25 |
| 5,390,247 A | 2/1995 | Fischer | 380/25 |
| 5,473,692 A | 12/1995 | Davis | 380/25 |
| 5,535,276 A * | 7/1996 | Ganesan | 713/155 |
| 5,539,828 A | 7/1996 | Davis | 380/50 |
| 5,559,884 A | 9/1996 | Davidson et al. | 380/4 |
| 5,568,552 A | 10/1996 | Davis | 380/4 |
| 5,592,553 A | 1/1997 | Guski et al. | 380/23 |
| 5,633,932 A | 5/1997 | Davis et al. | 380/25 |
| 5,664,017 A | 9/1997 | Gressel et al. | 380/30 |
| 5,745,678 A | 4/1998 | Herzberg et al. | 395/186 |
| 5,757,915 A | 5/1998 | Aucsmith et al. | 380/25 |
| 5,757,919 A | 5/1998 | Herbert et al. | 380/25 |
| 5,796,840 A | 8/1998 | Davis | 380/50 |
| 5,799,086 A | 8/1998 | Sudia | 380/23 |
| 5,805,706 A | 9/1998 | Davis | 380/42 |
| 5,805,712 A | 9/1998 | Davis | 380/50 |
| 5,818,939 A | 10/1998 | Davis | 380/49 |
| 5,844,986 A | 12/1998 | Davis | 380/4 |
| 5,852,665 A | 12/1998 | Gressel et al. | 380/30 |
| 5,858,939 A | 1/1999 | Tsaur | 510/141 |
| 5,892,904 A | 4/1999 | Atkinson et al. | 395/187.01 |
| 5,937,063 A | 8/1999 | Davis | 380/4 |

(Continued)

FOREIGN PATENT DOCUMENTS

| | | | | |
|---|---|---|---|---|
| EP | 0 686 906 A2 | A2 | 5/1995 | G06F/1/00 |
| EP | 0 778 512 A2 | A2 | 8/1995 | G06F/1/00 |
| WO | WO 98/45768 | A1 | 10/1998 | G06F/1/00 |
| WO | WO00 05837 | A1 | 2/2000 | H04L/9/30 |

OTHER PUBLICATIONS

Linn, John, "Practical Authentication for Distributed Computing," Proceedings of the Symposium on Research in Security and Privacy. Oakland, May 7, 1990, Los Alamitos, IEEE Comp. Soc. Press, US, vol. SYMP. 11, May 7, 1990, pp. 31–40, XP010020184, ISBM 0–8186–2060–9.

Menezes, Oorschot, "Handbook of Applied Cryptography," 1997, CRC Press LLC, USA XP002202168, pp. 559–560.

Primary Examiner—Justin T. Darrow
(74) Attorney, Agent, or Firm—Blakely, Sokoloff, Taylor & Zafman LLP

(57) ABSTRACT

In one embodiment, a platform comprises a processor, an input/output control hub (ICH), and a trusted platform module (TPM). Coupled to the ICH, the TPM comprises an internal memory, and an asymmetric key generation unit. The symmetric key generation unit produces an ephemeral asymmetric key pair including an ephemeral asymmetric public key and an ephemeral asymmetric private key. Both the ephemeral asymmetric public key and the ephemeral asymmetric private key are used for encryption and decryption operations during a single communications session.

10 Claims, 3 Drawing Sheets

U.S. PATENT DOCUMENTS

| | | | |
|---|---|---|---|
| 5,940,513 A | 8/1999 | Aucsmith et al. | 380/25 |
| 5,949,881 A | 9/1999 | Davis | 380/25 |
| 5,966,446 A | 10/1999 | Davis | 380/25 |
| 5,970,147 A | 10/1999 | Davis | 380/25 |
| 6,021,201 A | 2/2000 | Bakhle et al. | 380/25 |
| 6,023,509 A | 2/2000 | Herbert et al. | 380/25 |
| 6,058,478 A | 5/2000 | Davis | 713/191 |
| 6,199,053 B1 | 3/2001 | Herbert et al. | 705/76 |
| 6,363,480 B1 * | 3/2002 | Perlman | 713/164 |

* cited by examiner

PLATFORM AND METHOD FOR SECURELY TRANSMITTING AN AUTHORIZATION SECRET

BACKGROUND

1. Field

This invention relates to the field of data security. In particular, the invention relates to a platform and method for securely transmitting information using an ephemeral asymmetric key pair.

2. Background

In today's society, it is becoming necessary to transmit digital data from one location to another in a manner that is clear and unambiguous to a legitimate receiver, but incomprehensible to any illegitimate recipients. Accordingly, such data is typically encrypted by a software application executing some predetermined encryption algorithm and is transmitted to the legitimate receiver in encrypted form. The legitimate receiver then decrypts the transmitted data for use.

Often, encryption/decryption of data is accomplished through symmetric key cryptography. For symmetric key cryptography, the sender uses a key to encrypt data prior to transmission over an unsecured link. The receiver uses the same key to decrypt the data upon receipt. Although symmetric key cryptography is computationally simple, it requires complex key management. For instance, each sender would require a different symmetric key to communicate with an intended receiver, thereby making it difficult, if not impossible, to support a large number of persons. Another method of encryption/decryption is to create two separate key (referred to as a "key pair"). One key (public key) of the key pair is normally used for encryption while the other key (private key) of the key pair is normally used for decryption of the data. This method is commonly referred to as "asymmetric key cryptography". One disadvantage associated with asymmetric key cryptography is that the key pairs are not erasable after each communication session. Instead, they are permanently assigned and used for all communications. Thus, any disclosure of the private key mitigates or perhaps eliminates the security of any subsequent or previous communications.

BRIEF DESCRIPTION OF THE DRAWINGS

The features and advantages of the present invention will become apparent from the following detailed description of the present invention in which.

DESCRIPTION

Figure 1:
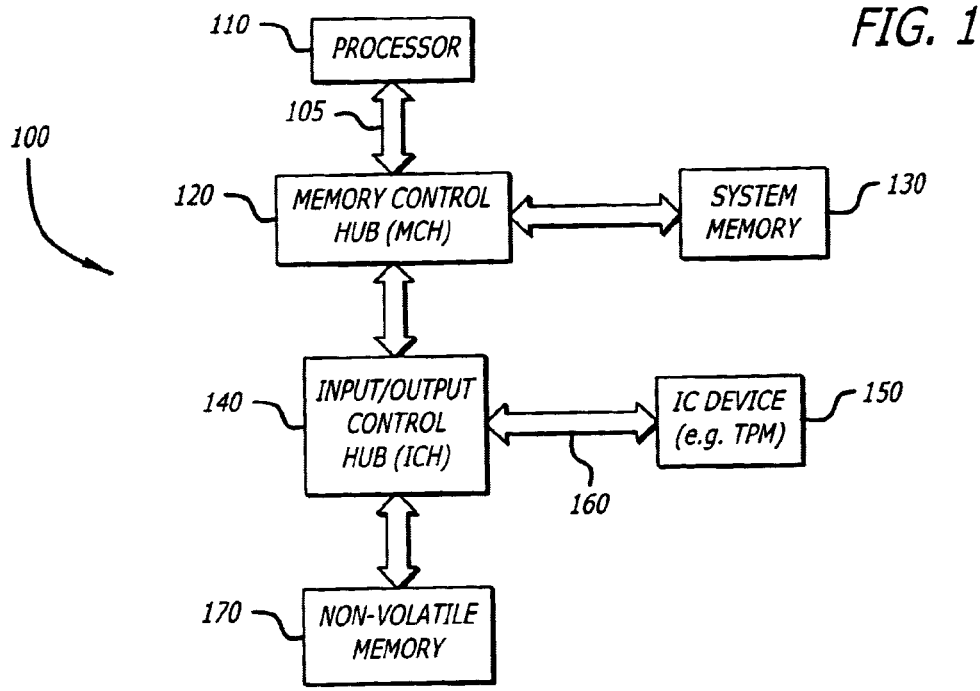
FIG. 1 is an exemplary embodiment of a platform practicing the invention.

The present invention relates to a platform and method for securely transmitting information such as authorization secret for example. Once loaded within a device, the authorization secret uses cryptographic operations to validate authorization data that accompanies an operation request directed to the device. In the event that the authorization data is validated, the device performs the requested operation. The secure transmissions may be accomplished through utilization of ephemeral asymmetric key pair(s) as described below.

In the following description, certain terminology is used to describe various features of the present invention. For example, a "platform" includes any product including a device (e.g., one or more packaged or unpackaged integrated circuits) that processes data Examples of various types of platforms include, but are not limited or restricted to a computer (e.g., desktop, laptop, server, workstation, personal digital assistant, etc.) or any peripheral associated therewith, wireless communication device (e.g., telephone handset, pager, etc.), a television set-top box and the like. A "link" is broadly defined as a logical or physical communication path such as, for instance, electrical wire, optical fiber, cable, bus trace, or even a wireless channel using infrared, radio frequency (RF), or any other wireless signaling mechanism.

In addition, the terms "information" or "content" are defined as one or more bits of data, address, control or any combination thereof. "Code" includes software or firmware that, when executed, performs certain functions. Examples of different types of code include an application, an applet, or any series of instructions.

Herein, various cryptographic terms are used to describe other features of the invention. For example, an "entity" is information used by a device to perform operations. For instance, an entity could be an asymmetric key, a symmetric key or random data. Entities temporarily held in locations outside an internal memory of the device are normally encrypted. When an entity is loaded into an internal memory of a device, an authorization secret for the entity is also loaded. The "authorization secret" is information held by the device (e.g., in its internal memory). Knowledge of the authorization secret allows access to the entity, and/or information stored in the internal memory, and/or allows certain operations to be performed by the platform implemented with the device. "Authorization data" is the result of a cryptographic operation that proves knowledge of the authorization secret for an entity and should accompany each operation request.

An "identity" is a specific type of entity. For one embodiment, an identity includes a label that is unique within some context and attached to an object (e.g., segments of executable code) and/or secret data that is statistically improbable to estimate without disclosure. For instance, with respect to this embodiment, the secret data may include a permanent asymmetric key pair as described below. This allows a platform to support different access privileges to stored content or different operations, depending on the identity conferred by the requester. To prove an identity, a cryptographic engine operates on input data, using the secret data, to produce output data where the output data is statistically impossible to produce without the secret data. The capability of producing the output data is taken as proof of possession of the secret data, and hence as proof of identity.

It is appreciated that certain details are set forth in order to provide a thorough understanding of the present invention. It will be apparent to a person of ordinary skill in the art, however, that the present invention may be practiced through many embodiments other that those illustrated. Well-known circuits are not set forth in detail in order to avoid unnecessarily obscuring the present invention.

Referring to FIG. 1, an exemplary block diagram of an illustrative embodiment of a platform 100 employing the present invention is shown. The platform 100 comprises a processor 110, a memory control hub (MCH). 120, a system memory 130, an input/output control hub (ICH) 140, and an integrated circuit (IC) device 150 which initiates, monitors and controls the authentication process of the platform 100.

As shown in FIG. 1, the processor 110 represents a central processing unit of any type of architecture, such as complex instruction set computers (CISC), reduced instruction set computers (RISC), very long instruction word (VLIW), or a hybrid architecture. In one embodiment, the processor 110 is compatible with the INTEL® Architecture (IA) processor, such as the IA-32 and the IA-64. Of course, in an alternative embodiment, the processor 110 may include multiple processing units coupled together over a common host bus 105.

Coupled to the processor 110 via the host bus 105, the MCH 120 may be integrated into a chipset that provides control and configuration of memory and input/output devices such as the system memory 130 and the ICH 140. The system memory 130 stores system code and data. The system memory 130 is typically implemented with dynamic random access memory (DRAM) or static random access memory (SRAM).

The ICH 140 may also be integrated into a chipset together or separate from the MCH 120 to perform I/O functions. As shown, the ICH 140 supports communications with the IC device 150 via link 160. Also, the ICH 140 supports communications with components coupled to other links such as a Peripheral Component Interconnect (PCI) bus at any selected frequency (e.g., 66 megahertz "MHz", 100 MHz, etc.), an Industry Standard Architecture (ISA) bus, a Universal Serial Bus (USB), a Firmware Hub bus, or any other bus configured with a different architecture than those briefly mentioned.

The ICH 140 may be coupled to non-volatile memory 170 (e.g., flash memory) that contains Basic Input/Output System (BIOS) code for example.

Figure 2:
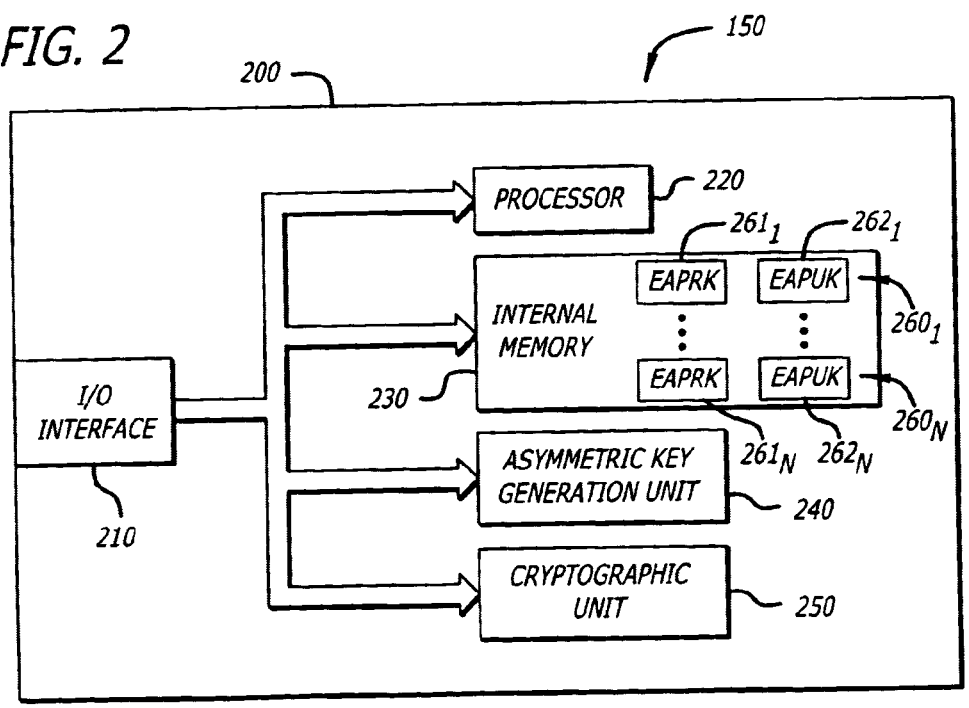
FIG. 2 is an exemplary embodiment of the IC device as a Trusted Platform Module (TPM) employed within the platform of FIG. 1.

Referring to FIG. 2, an exemplary embodiment of the IC device 150 is shown as a Trusted Platform Module (TPM), which features one or more integrated circuits placed within a protective package 200. For instance, the protective package 200 may be any type of IC package such as an IC package for a single IC or a package for a multi-chip module. Alternatively, the protective package 200 may include a cartridge or casing covering a removable daughter card featuring the integrated circuit(s) and the like.

As shown in FIG. 2, the TPM 150 comprises an input/output (I/O) interface 210, a processor 220, internal memory 230 (e.g., volatile and/or non-volatile), an asymmetric key generation unit 240 and a cryptographic engine 250. It is contemplated that the cryptographic engine 250 may be part of the processor 220 or separate logic therefrom.

Herein, the asymmetric key generation unit 240 is configured to create to one or more (N) ephemeral asymmetric key pairs $260_1$–$260_N$. Each key pair $260_1$–$260_N$ includes an ephemeral asymmetric private key (EAPRK) $261_1$–$261_N$ and a corresponding ephemeral asymmetric public key (EAPUK) $262_1$–$262_N$. Each ephemeral asymmetric key pair $260_1$–$260_N$ is used for encryption and decryption operations during a single communication session with another platform and may be erased after completion of the communication session either automatically or through issuance of an authenticated software command. For instance, a single communication session may involve (i) establishment of communications with another platform, (ii) creation of a new entity (including the transmission of authorization data) and (iii) termination of the communications.

The TPM 150 allows access to certain entities stored in a portion of the internal memory 230 and/or performance of selected operations by its platform only upon receipt of authorization data by the processor 220.

In order to protect the confidentiality of an authorization secret. during transmission to the TPM 150 as well as insure its integrity, the TPM 150 utilizes a secure data transmission mechanism. The confidentiality of transmissions is protected through encryption of the authorization secret. Likewise, its integrity is protected by the ability of the sender to verify that the authorization secret is being transferred to a TPM and that only a specific TPM can decrypt the data.

Figure 3:
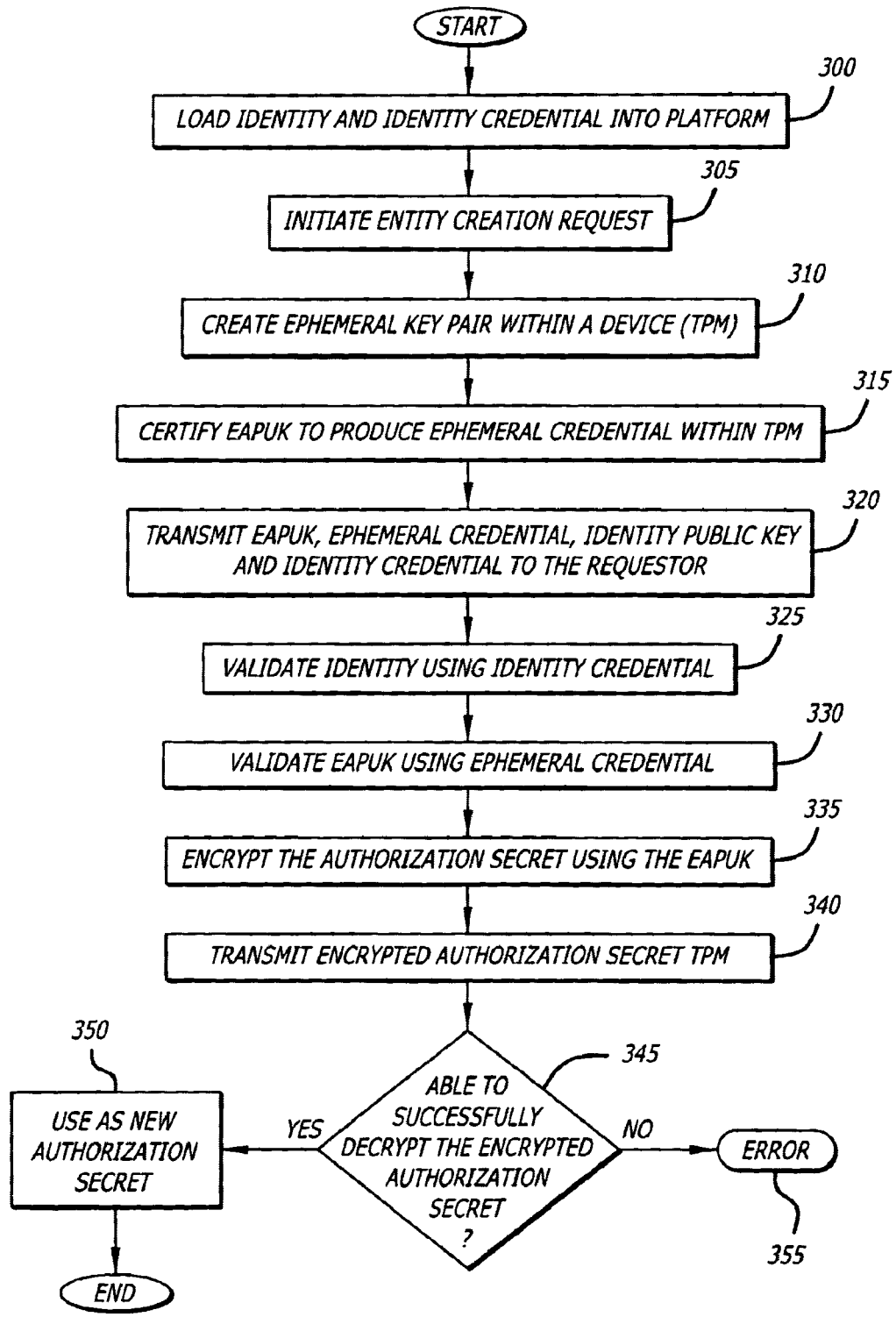
FIG. 3 is an exemplary embodiment of a flowchart illustrating the secure data transmission mechanism.

Referring to FIG. 3, an exemplary embodiment of a flowchart illustrating the secure data transmission mechanism is shown. Initially, the platform is loaded with an identity and a credential associated with that identity (block 300). The "identity credential" may include (i) secret data associated with the identity (e.g., a permanent asymmetric public key of the identity, referred to as the "identity public key") and (ii) a first sequence of alphanumeric characters (e.g., a statement "TCPA Subsystem Identity"). This information is digitally signed with a private key (CAPRK) of a certification authority being a trusted third party such as an original equipment manufacturer, a governmental agency, a bank, a designated certification entity and the like. Of course, prior to the digitally signing operation, the at least a portion of the secret data and the first sequence of alphanumeric characters may collectively undergo a hash operation.

In order to create a new entity for the platform, the requester initiates an entity creation request that specifies which identity that the requester wishes to use for validation purposes (block 305). For instance, the platform may employ multiple software tools that constitute identities, each having a unique name (or label). In response to receiving the entity creation request, the TPM generates an ephemeral asymmetric key pair for the new TPM entity (block 310). The ephemeral asymmetric key pair includes an ephemeral asymmetric public key (EAPUK) and an ephemeral asymmetric private key (EAPRK).

Thereafter, as described in block 315, the EAPUK is certified internally within the TPM (e.g., digital certification performed by the cryptographic engine 250 of FIG. 2 using a portion of the secret data associated with the selected identity). This produces an ephemeral credential. Normally, the "ephemeral credential" includes the EAPUK and a second sequence of alphanumeric characters (e.g., a statement "TCPA Trusted Platform Module Endorsement"), both can be digitally signed with a portion of the secret data such as a private key associated with the identity (referred to as the "identity private key"). Of course, prior to the digitally signing operation, the EAPUK and the second sequence of alphanumeric characters may collectively undergo a hash operation.

In another embodiment, the ephemeral credential includes the EAPUK, the second sequence of alphanumeric characters and an identity label. This information in its entirety may be digitally signed with the identity private key, or in the alternative, this information may undergo successive or reiterative hash operations to produce a hash value, where the hash value is digitally signed with the identity private key. In yet another embodiment, the ephemeral credential may be the EAPUK digitally signed with the identity private key.

Thereafter, the EAPUK, ephemeral credential, secret data associated with the identity (e.g., at least the identity public key) and the identity credential are transmitted over a link to the requester (block 320). The requester can validate the identity using the identity credential by gaining access to a widely disseminated public key (CAPUK) of the certification authority (block 325). The requester then validates the EAPUK and the ephemeral credential as being signed by the identity private key since the identity credential features the identity public key (block 330). This allows the requester to now believe that the EAPUK came from a valid TPM without knowledge of which particular TPM. Also, this allows the requester to have confidence that only a TPM will be able to decrypt an authorization secret.

Figure 4:
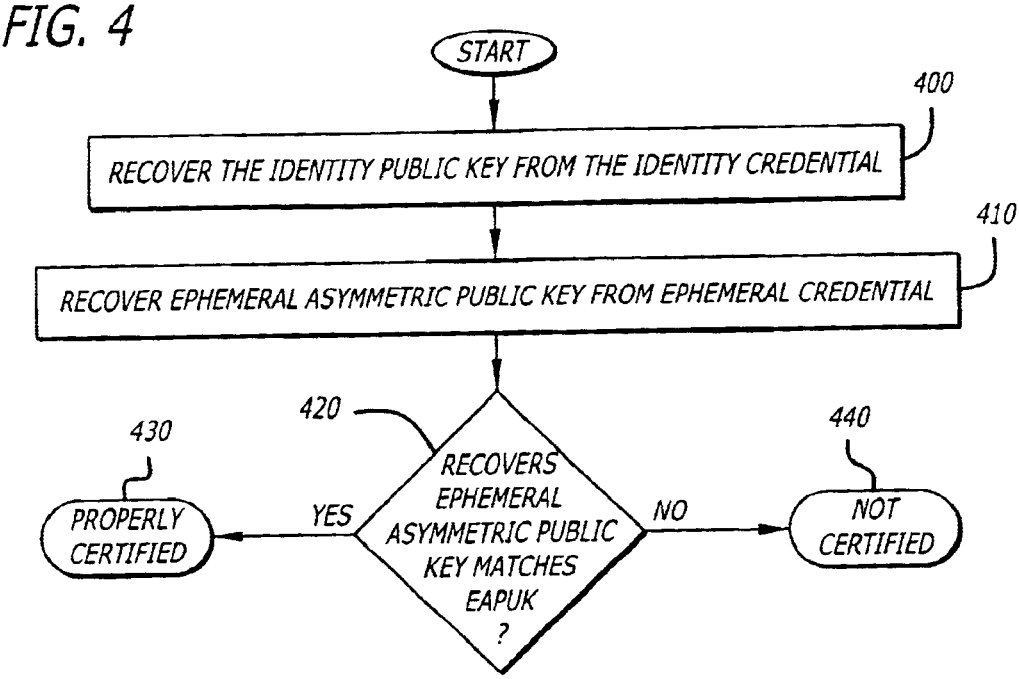
FIG. 4 is an exemplary embodiment of a block diagram for verifying that an ephemeral asymmetric public key (EAPUK) is a valid key through validation of the ephemeral credential and the EAPUK without using hash operation(s).
Figure 5:
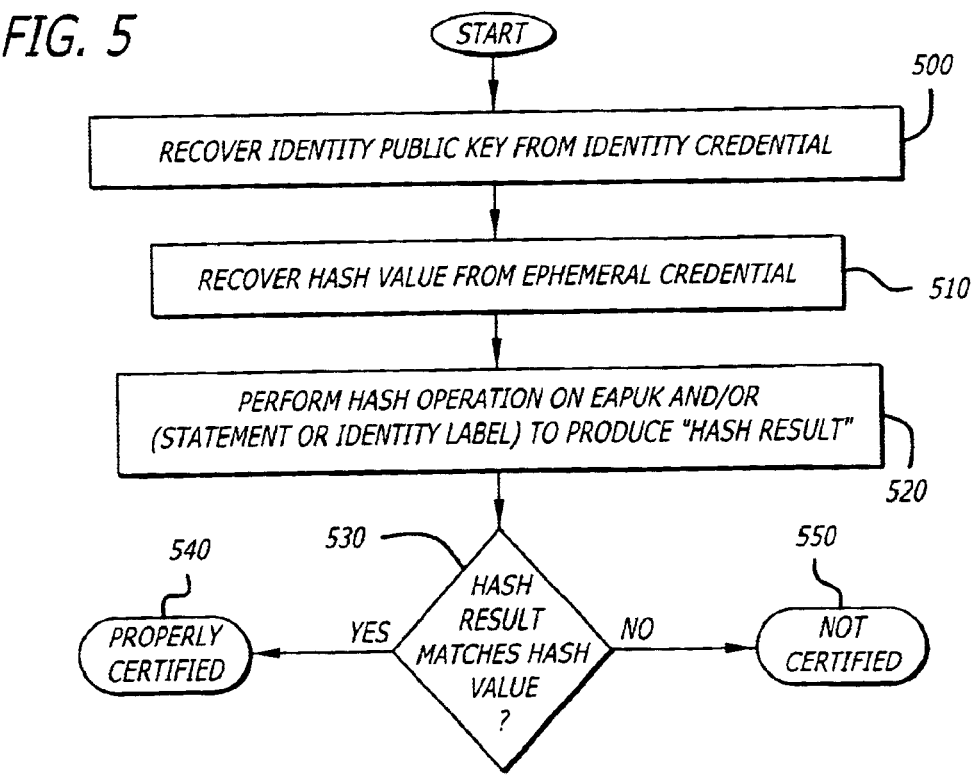
FIG. 5 is an exemplary embodiment of a block diagram for verifying that EAPUK is a valid key through validation of the ephemeral credential and the EAPUK using hash operation(s).

In the situation where the digital signing operation does not utilizing a hash operation, as shown in FIG. 4, the ephemeral credential and EAPUK are validated by recovering the identity public key from the identity credential (block 400). This is due to the fact that the public key of the certification authority may be readily available. Upon recovery of the identity public key, the ephemeral asymmetric public key can be recovered from the ephemeral credential (block 410). The recovered ephemeral asymmetric public key is then compared with EAPUK (block 420). If both values compare, the EAPUK is valid and properly certified (block 430). Otherwise, EAPUK is not certified (block 440).

Alternatively, in the situation where the digital signing operation utilizes a hash operation, the ephemeral credential and EAPUK are validated by recovering the identity public key from the identity credential (block 500). Upon recovery of the identity public key, a hash value of the ephemeral credential can be recovered from the ephemeral credential (block 510). Moreover, a hash operation is performed on the EAPUK (and perhaps the second sequence of alphanumeric characters or identity label if applicable) to produce a hash result (block 520). The hash result is then compared to the hash value (block 530). If the hash result matches the hash value, the EAPUK is valid and properly certified (block 540). Otherwise, EAPUK is not certified (block 550).

Referring back to FIG. 3, the authorization secret is encrypted using EAPUK (block 335). In one embodiment, the size of the authorization secret is set at M bits (e.g., M $\leq$ 160 bits) so the asymmetric cryptographic function is able to encrypt the authorization secret. Also, the authorization secret may contain some static markers to allow the TPM to determine if decryption was successful.

The encrypted authorization secret is transmitted over a link to the TPM along with static markers and perhaps additional parameters necessary for creation of the entity (block 340). Upon receipt, the TPM decrypts the encrypted authorization secret using EAPRK and determines whether the decryption was successful through comparison of static markers for example (block 345). If the decryption was successful, the decrypted authorization secret is used as the authorization secret for the new TPM entity (block 350). Otherwise, an error is reported (block 355).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the present invention or some of its features in hardware, firmware, software or a combination thereof where the software is provided in a processor readable storage medium such as a magnetic, optical, or semiconductor storage medium.

What is claimed is:

1. A method comprising
receiving an ephemeral asymmetric public key and an ephemeral credential, the ephemeral credential includes at least a duplicate copy of the ephemeral asymmetric public key digitally signed with an identity private key;
verifying that the ephemeral asymmetric public key is valid using data recovered from the ephemeral credential, includes
recovering the duplicate copy of the ephemeral asymmetric public key from the ephemeral credential, and
comparing the duplicate copy of the ephemeral asymmetric public key with the ephemeral asymmetric public key;
encrypting authorization secret using the ephemeral asymmetric public key if the ephemeral asymmetric public key is determined to be valid; and
transmitting the encrypted authorization secret over a link.

2. The method of claim 1, wherein prior to verifying that the ephemeral asymmetric public key is valid, the method further comprises receiving of an identity public key and an identity credential.

3. The method of claim 2, wherein the ephemeral credential further includes a predetermined sequence of alphanumeric characters.

4. The method of claim 2, wherein the link routes the encrypted authorization secret to a trusted platform module including an input/output interface, a processor, an internal memory and an asymmetric key generation unit.

5. The method of claim 4, further comprising:
recovering the authorization secret by decrypting the encrypted authorization secret using an ephemeral asymmetric private key corresponding to the ephemeral asymmetric public key, both the ephemeral asymmetric private key and the ephemeral asymmetric public key are temporarily used for a single communication session.

6. A method of claim 5, wherein prior to receiving the ephemeral asymmetric public key and the ephemeral credential, both the ephemeral asymmetric public key and the ephemeral asymmetric private key are created by the asymmetric key generation unit within the trusted platform module.

7. The method of claim 1, wherein the recovering of the duplicate copy of the ephemeral asymmetric public key includes decrypting the ephemeral credential with an identity public key.

8. A method comprising:
creating an ephemeral asymmetric public key and a corresponding ephemeral asymmetric private key internally within an integrated circuit device;
certifying the ephemeral asymmetric public key;
transmitting the ephemeral asymmetric public key and an ephemeral credential to an requester in order to determine whether the ephemeral asymmetric public key is valid; and using the ephemeral asymmetric public key for protecting confidentiality of an authorization secret provided by the requester during a communication session, the authorization secret is any type of information that enables access to stored content within the integrated circuit device.

9. A method creating an ephemeral asymmetric public key and a corresponding ephemeral asymmetric private key internally within an integrated circuit device;

certifying the ephemeral asymmetric public key;

transmitting the ephemeral asymmetric public key and anephemeral credential to an requester in order to determine whether the ephemeral asymmetric public key is valid; and using the ephemeral asymmetric public key for protecting confidentiality of an authorization secret provided by the requester during a communication session, the authorization secret is any type of information that enables selected functionality for a platform including the integrated circuit device.

10. The method of claim 9, wherein protecting of the confidentiality of the authorization data includes encrypting the authorization secret using the ephemeral asymmetric public key.

* * * * *

UNITED STATES PATENT AND TRADEMARK OFFICE
CERTIFICATE OF CORRECTION

PATENT NO. : 6,948,065 B2
DATED : September 20, 2005
INVENTOR(S) : Grawrock

It is certified that error appears in the above-identified patent and that said Letters Patent is hereby corrected as shown below:

Column 1,
Line 33, delete the first occurrence of "key" and insert -- keys --.

Column 3,
Line 59, delete the second occurrence of "to".

Column 4,
Line 11, delete ".".

Column 7,
Line 13, delete "anephemeral" and insert -- an ephemeral --.

Signed and Sealed this

Thirty-first Day of January, 2006

JON W. DUDAS
*Director of the United States Patent and Trademark Office*